United States Patent [19]

Engström

[11] Patent Number: 4,651,014
[45] Date of Patent: Mar. 17, 1987

[54] METHOD FOR COMPARISON BETWEEN A FIRST OPTICAL SIGNAL AND AT LEAST ONE OTHER SIGNAL

[75] Inventor: Olof Engström, Linköping, Sweden

[73] Assignee: Forsvarets Forskningsanstait, Stockholm, Sweden

[21] Appl. No.: 525,045
[22] PCT Filed: Nov. 19, 1982
[86] PCT No.: PCT/SE82/00390
 § 371 Date: Jul. 22, 1983
 § 102(e) Date: Jul. 22, 1983
[87] PCT Pub. No.: WO83/01852
 PCT Pub. Date: May 26, 1983

[30] Foreign Application Priority Data

Nov. 23, 1981 [SE] Sweden .................................. 8106927

[51] Int. Cl.⁴ .............................................. H01J 40/14
[52] U.S. Cl. ..................................... 250/578; 358/212; 382/41
[58] Field of Search ................... 250/213, 578, 211 R, 250/211 J; 358/212, 213; 357/24, 30; 382/41

[56] References Cited

U.S. PATENT DOCUMENTS 3,894,295  7/1975  Shannon et al. ....................... 357/19
3,916,268 10/1975  Engeler ................................. 357/30
4,334,239  6/1982  Herbst .................................... 358/44
4,539,591  9/1985  Zermeno ............................. 250/213

FOREIGN PATENT DOCUMENTS 2623541  5/1976  Fed. Rep. of Germany .
76064385  6/1976  Sweden .
1444543  9/1972  United Kingdom .

Primary Examiner—Edward P. Westin
Assistant Examiner—William L. Oen
Attorney, Agent, or Firm—Fleit, Jacobson, Cohn & Price

[57] ABSTRACT

The present invention relates to a method for comparison between a first optical signal ($\Phi_1$) and at least one other signal. The invention can for instance be used for image recognition. In this application it is a problem to be able to perform parallel processing of the content of an image. This problem among others is solved in connection with the invention by illuminating a MIS-structure (11; FIG. 1) with the first optical signal ($\Phi_1$), which creates an optically induced change in the surface potential of the MIS-structure and by influencing the surface potential also by said at least one other signal by illuminating the MIS-structure (11; FIG. 1) with a second optical signal ($\Phi_2$) or by applying the signal in the form of a voltage across the structure or by providing the structure with charge in the insulator or its interfaces or by a combination of these methods and by varying at least one of all signals as a function of time.

16 Claims, 12 Drawing Figures

METHOD FOR COMPARISON BETWEEN A FIRST OPTICAL SIGNAL AND AT LEAST ONE OTHER SIGNAL

INTRODUCTION

The present invention relates to a method for comparison between a first optical signal and at least one other signal.

The predominant technique today for processing optical information in the form of images is to process the content of the image point by point. One often uses an image sensor of the charge transfer device type, from which the image information is fed out point by point and stored in a memory. The content of this memory is then processed bit by bit against information stored in an operator memory. In this way operations of the type correlation, derivation etc in order to recognize images or different kinds of transformations of matrices for bandwidth-limitation of the content of the images is performed. As this method means a serial processing of a very large amount of information the image processing becomes time consuming and it demands a very high computer capacity.

During the last years there has been a great international activity to create methods performing parallel processing of the content of an image. This means that all image points are processed simultaneously, which gives tremendous benefits in the calculation time. The use of Fourier-transformation is a possibility due to the nature of coherent light. Such methods demand a very high mechanical stability in the optical system that is used for processing the image.

The invention that will be described here, has at least four advantages compared with previous solutions for processing images:
(i) It is based on a very simple sensor structure
(ii) It can perform parallel processing
(iii) It uses incoherent light
(iv) An image can be processed with optical signals, electric signals or a combination of these. The operative signals can either be addressed to discrete image points or operate parallelly over the image or parts of it.

The mentioned advantages are achieved by the invention that is evident from the following description.

BRIEF DESCRIPTION OF THE DRAWINGS

In the following, the invention will be further described with reference to the attached drawings, in which.

DETAILED DESCRIPTION

Figure 2:
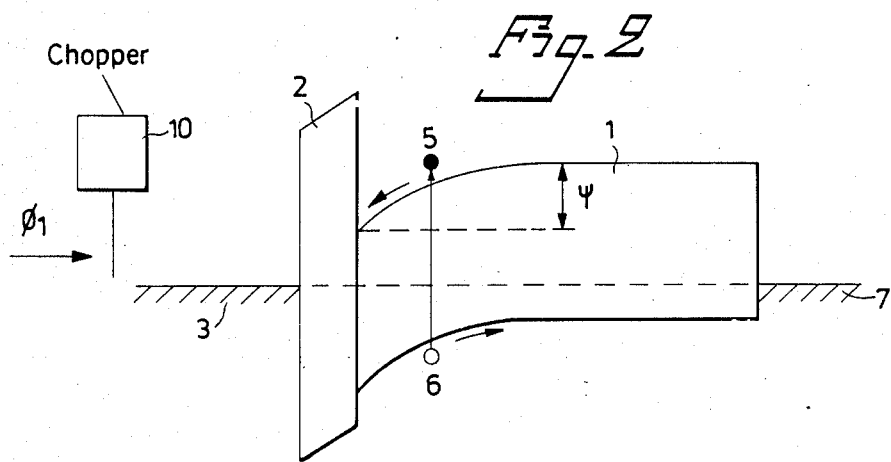
FIG. 2 shows the energy band model for a structure according to FIG. 1 illuminated by chopped light.
Figure 3:
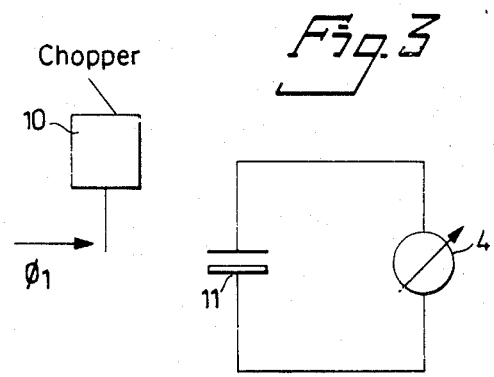
FIG. 3 shows the structure in FIGS. 1 and 2 connected to a measuring instrument.
Figure 4:
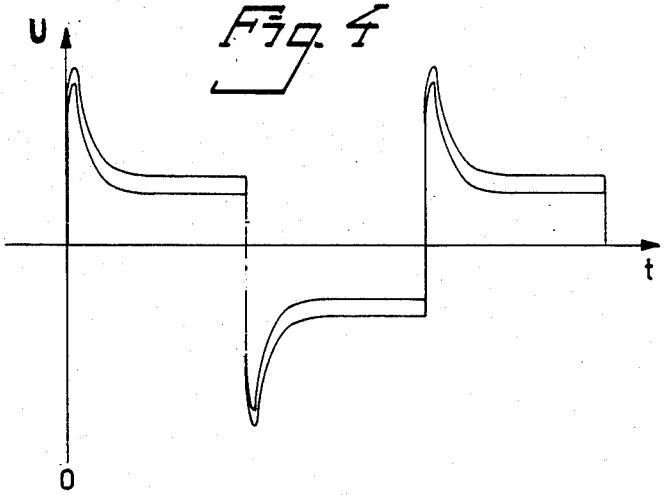
FIG. 4 shows an oscilloscope picture from a device according to FIGS. 1-3.
Figure 5:
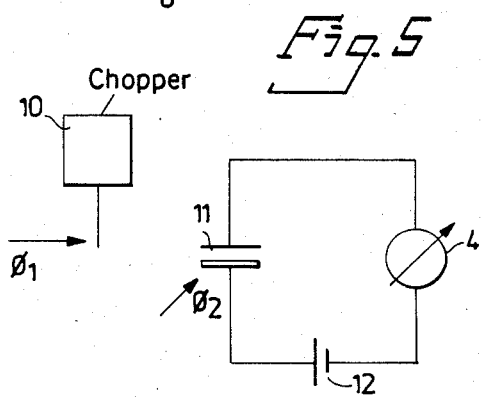
FIG. 5 shows the structure illuminated both with chopped light and constant light.

The device comprises (FIG. 1) a MIS-structure (Metal Insulator Semiconductor Structure) consisting of a semiconductor 1 with a thin insulator layer 2, on which a thin electrically conducting layer 3 is applied. Metal contact 7 is on the back side of the structure. The energy band model for such a structure is shown in FIG. 2. The component in FIG. 2 is illuminated by chopped light from a chopper 10 and it is connected to an electric measuring instrument 4 in order to measure the current or the voltage as is shown in FIG. 3. The MIS-structure is indicated with 11. In the example reported here chopped light is thus used, which is easy to implement and makes the result easy to interpet. It must however be emphasized that it means no difference in principle if the intensity of the optical radiation varies as a function of time in another way or in the cases with several signals, that are mentioned below, if one of them varies as a function of time in such a way. The light in the present example, which has an intensity $\Phi_1$ and a photoenergy greater than the band gap of the semiconductor, gives rise to optically generated electrons and holes within the semiconductor. A condition for the good functioning of the component is that the energy band of the semiconductor bend at the surface. This can be controlled by introducing surface charges or by choosing the electrically conducting layer 3 in a suitably way. If the energy bands of the semiconductor are bent before the illumination in such a way that is shown in FIG. 2, the electrons 5 created by the light will be accumulated in the energy well that exist in the semiconductor near its interface with the insulator. The holes 6, that are created during the illumination, will drift into the bulk of the semiconductor and further out into an outer circuit through the metal contact 7 that is found on the backside of the component. A displacement of charge is thereby created, which can be measured as a current or a voltage with the instrument 4 in the outer circuit. This displacement of charge will continue until the bending of the energy band of the semiconductor near the insulator layer stops due to the neutralisation of charge that has been created by the illumination after a certain time. The length this time is determined by the total RC-constant of the circuit shown in FIG. 3. If the RC-constant is long compared with the chopping frequency, one gets such a signal in the outer circuit as is shown in FIG. 4, which is an oscilloscope picture of the electric signal U(t) from a device according to FIGS. 1–3. The amplitude of the signal U(t) in FIG. 4 is dependent upon the intensity $\Phi_1$ and also upon the size $\psi$ of the bending of the energy band in FIG. 2. For a certain intensity $\Phi_1$ the amplitude of the signal U(t) in FIG. 4 can therefore be varied by changing the surface potential $\psi$ in FIG. 2. This change can be attained in two ways: By applying an outer voltage from a voltage source 12 between the contacts 3 and 7 or by illuminating the MIS-structure with an additional light source with constant light intensity $\Phi_2$ (FIG. 5).

Figure 6:
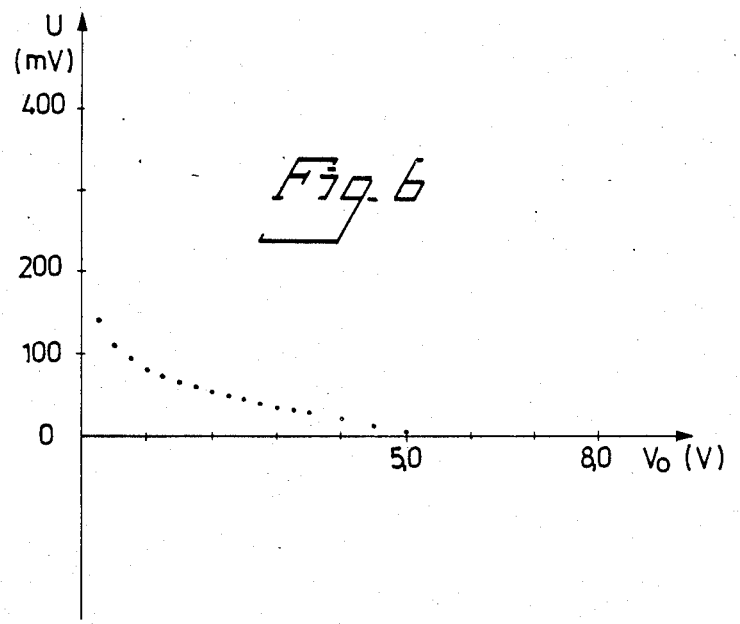
FIG. 6 shows experimental data of the electric signal U as a function of an applied outer potential $V_o$ during illumination with a chopped light source with the intensity $\Phi_1$.

FIG. 6 shows experimental data of the electric signal U as a function of an applied outer voltage $V_o$ during illumination with a chopped light source having the intensity $\Phi_1$. The essential information from FIG. 6 is that the signal U achieved by illuminating the MIS-structure with the chopped intensity $\Phi_1$ can be controlled by the voltage $V_o$.

Figure 7:
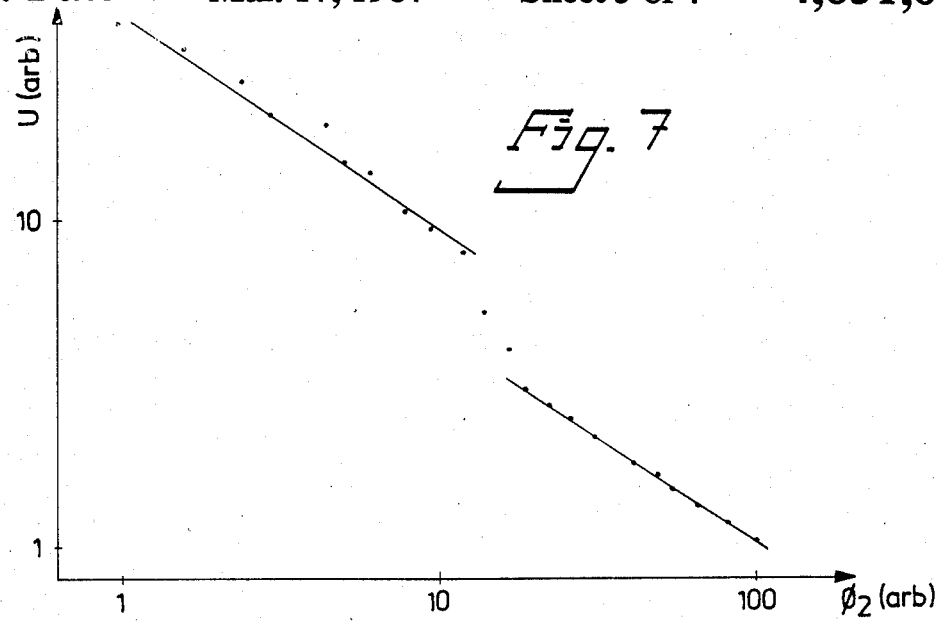
FIG. 7 shows experimental data of how the electric signal U from the MIS-structure can be controlled by another light source with constant intensity $\Phi_2$.

FIG. 7 shows experimental data of how the electric signal U from the MIS-structure can be controlled by an additional light source with constant (non-chopped) intensity $\Phi_2$. The extra light source gives rise to a reduction of the surface potential $\psi$ (FIG. 2), which reduces U. In FIG. 7 one can see that for $\Phi_2 \leq 10$ and $\Phi_2 \geq 20$ $U=f(\Phi_2)$ is a nearly hyperbolic function. The knee in the curve, that is found at $\Phi_2 \approx 15$ depends upon energy states in the interface between the insulator and the semiconductor and has no qualitative effect on the function of the component. Such energy states can be affected by a thorough control of the manufacturing procedure during the application of the isulator layer on the semiconductor.

Figure 8:
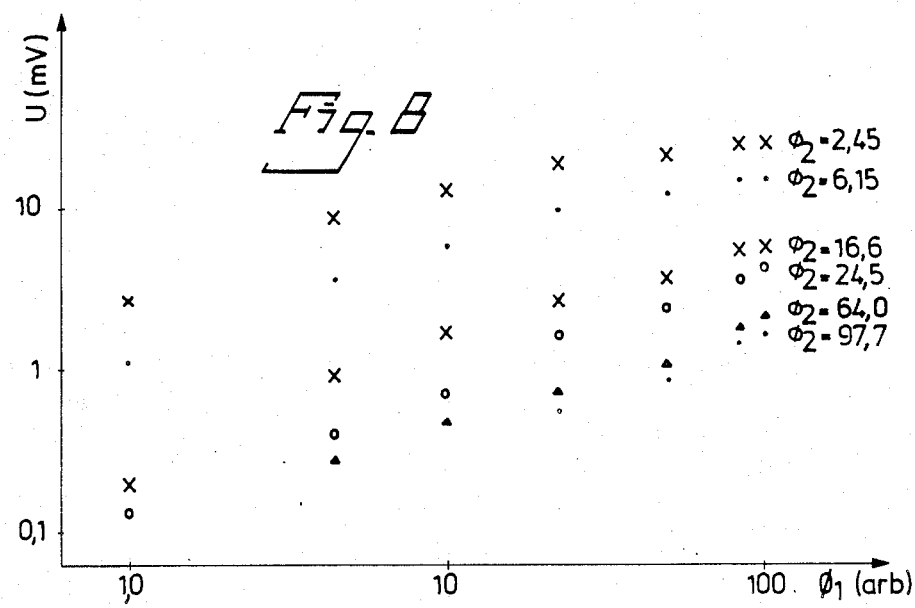
FIG. 8 shows experimental data of the electric signal U as a function of the chopped light source with the intensity $\Phi_1$, with the intensity $\Phi_2$ from the constant light source as a parameter.

That the signal U is also a function of the chopped intensity $\Phi_1$ is shown in FIG. 8, which represents experimental data of $U=f(\Phi_1)$ with $\Phi_2$ as a parameter.

We have now shown with theoretical arguments and experimental data how the optically induced electric signal from a MIS-structure can be controlled by another optical signal $\Phi_2$. It is therefore possible to write $$U = f(V_o, \Phi_1, \Phi_2)$$

We shall now see how these characteristics of the above described MIS-structure can be used for processing optical information.

OPTICAL-OPTICAL PROCESSOR

Figure 1:
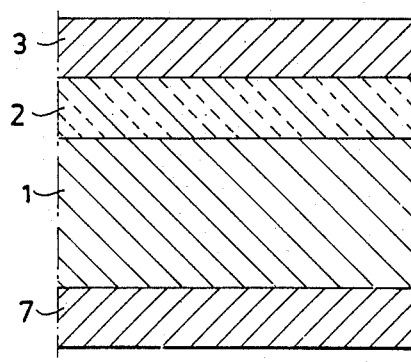
FIG. 1 shows a cross-section of the MIS-structure (metal insulator semiconductor structure)
Figure 9:
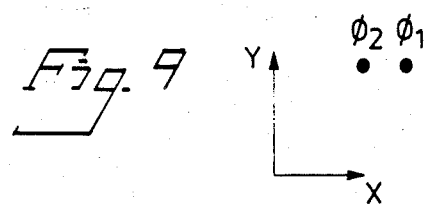
FIG. 9 shows a slice, in the form of a MIS-structure according to FIG. 1 seen from the side on which the conductor 3 is applied, illuminated in one point by chopped light with the intensity $\Phi_1$ and in another point by constant light with the intensity $\Phi_2$.
Figure 10:
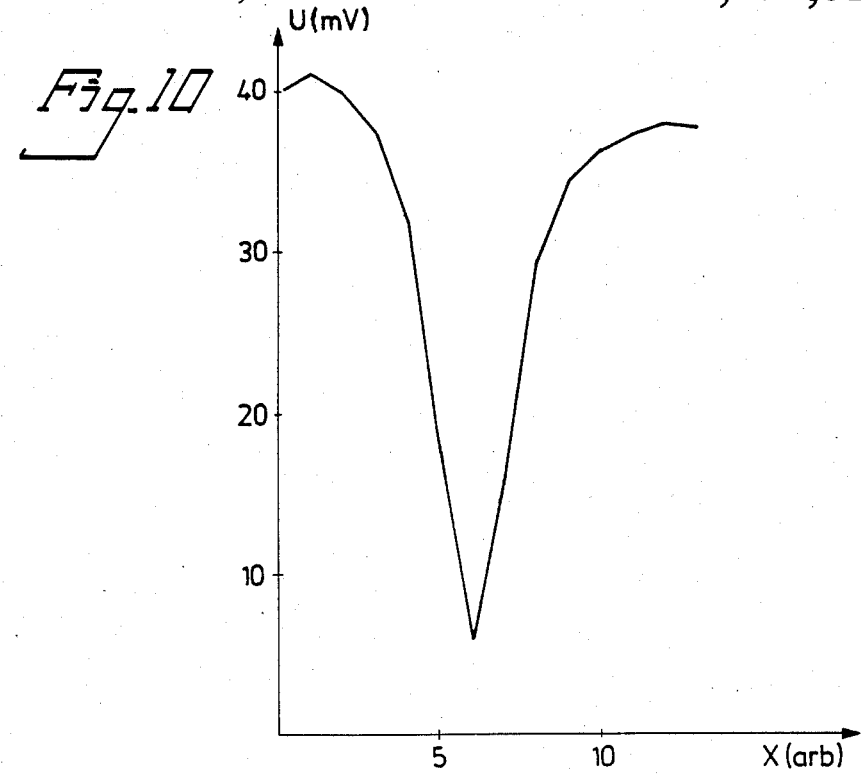
FIG. 10 shows the electric signal U as a function of the displacement of the light spot with the intensity $\Phi_2$ in FIG. 9.

FIG. 9 shows a slice in the form of a MIS-structure according to FIG. 1 seen from the side, on which the conductor 3 is applied. We imagine a system of co-ordinates (x, y) in the plane of the slice and illuminate the slice in two different points, with the chopped intensity $\Phi_1$ and also with the constant intensity $\Phi_2$. The time-dependent outsignal U is then only determined by $\Phi_1$ as $\Phi_2$ does not influence the surface potential $\psi$ in the point that is illuminated with $\Phi_1$. If, however, the light spot with the intensity $\Phi_2$ is moved in X-direction towards $\Phi_1$, the signal U will be influenced by $\Phi_2$ as soon as the two light spots start to coincide. An experiment verifying this is shown in FIG. 10, in which the signal U is measured as a function of the displacement of the light spot with the intensity $\Phi_2$ in FIG. 9. The two light spots coincide completely when X=6.0, which is the point in which U has a minimum.

Now it is easy to generalize this reasoning so that it is valid for two images described by the functions $\Phi_1(x, y)$ and $\Phi_2(x, y)$. If the image $\Phi_1(x, y)$ is chopped in the same way as previously the light spot $\Phi_1$, one will get a charge displacement in every point (x, y) in the surface of the MIS-structure which will add up to a signal U in the outer circuit. We saw previously (FIGS. 7 and 8) that U is approximately reciprocally proportional to $\Phi_2$ and approximately proportional to $\Phi_1$. For two images the signal is an expression of the type $$U = \int \int \frac{\Phi_1(x,y)}{1 + \Phi_2(x,y)} \, dx \, dy$$

This signal has a minimum when $\Phi_1$ and $\Phi_2$ are identical and coincide. The above-mentioned device can therefore be used for image recognition. The dependence of the signal U on $\Phi_1$ and $\Phi_2$, as it is described in FIGS. 7 and 8, can be varied by a suitable doping of the semiconductor and by introducing suitable energy states between the insulator 2 and the semiconductor 1.

In order to improve the lateral resolution during the correlation of two images, one can also see that the energy well for electrons or holes, that exists at the interface between the insulator and the semiconductor, is limited in lateral direction. The surface is then provided with a large number of such laterally limited energy wells, each of which constituting an image point. This prevents the electrons and holes at the surface to spread out over a larger area, which increases the lateral resolution. Another way to improve the resolution is to limit the mobility of the charge carriers in the energy well. A lateral limitation of the energy wells and a reduction of the mobility is achieved by introducing surface charge, selecting in a suitable way the doping or the material in the conductor 3.

If any of $\Phi_1$ and $\Phi_2$ is choosen as an image, the other light signal can be choosen as a point shaped light source and be scanned in a raster pattern over the image. This makes it possible to have a serial reading of an image in the same way as in a television camera. By time differentiating the so created signal the image content can be differentiated in an arbitrary direction along the surface of the slice. By time integrating the signal in a corresponding way it is possible to carry out a line integration in the image. It is further possible to matrix multiply two images with each other by designing the MIS-structure in a suitable way.

OPTICAL-ELECTRIC PROCESSOR

Figure 11:
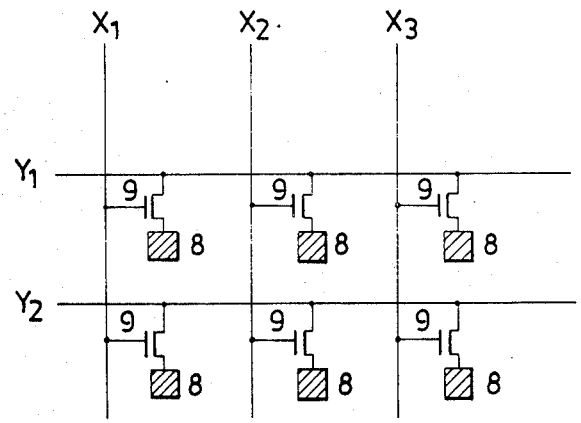
FIG. 11 shows how different image points in an opto-electric processor can be addressed.

By using the characteristic of the MIS-structure, described in connection with FIG. 6, namely that the signal U can be controlled by an outer voltage $V_o$, it is possible to make a processor using electric operator signals. The conductor 3 in FIG. 1 is then designed as a pattern of squares over the insulator surface in the way that is evident from FIG. 11. Each such conducting square 8 is addressed by x- and y-conductors via a MOS-transistor 9, integrated in the semiconductor slice. With this structure it is possible to operate on an image with optical signals in the way described in section 3 and also with electric signals so that parts of an image can be selected with the possibilities of addressing described in FIG. 11.

There is also other possibilities of electric processing. One example is to cross pairs of interconnected conductors, which pairs are insulated from all other pairs. In the crossing point between such pairs an area is created in which the surface potential $\psi$ can be influenced. Such a crossing point can constitute an image point and can be addressed by applying a potential to the crossing conductor pairs.

Figure 12:
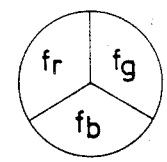
FIG. 12 shows how an image point in a colour sensitive optical processor can be designed.

The colour information can be read from an image by scanning in a raster pattern according to section 3 if each image point is formed by several conducting layers 3 on top of the insulator 2, which layers are insulated from each other (see FIG. 12).

Each part of the image point is, in addition to the conducting material, also provided with an optical band-pass filter with a typical band-pass wavelength for each part of the image point. Each part of the image point is then modulated by an electric alternating voltage signal $V_o$ with a characteristic frequency $f_r$, $f_g$, $f_b$ etc for each part of the image point. The colour information in an image is obtained by band-pass filtering the electric outsignal U at the frequencies $f_r$, $f_g$, $f_b$ etc.

PERMANENT PROGRAMMING

By introducing over the surface of the MIS-structure a varying surface charge, the surface potential $\psi$ will vary over the surface already before it is illuminated. This means a possibility to provide the processor with read only programming. There are several possibilities to introduce such a varying surface potential. One possibility is to make the MIS-structure as a so called FAMOS-structure, which means that a floating gate, a conducting material, is included in the insulator layer at the manufacture. The processor can then be programmed by applying a voltage over the FAMOS-structure at the same time as it is illuminated with an image containing the pattern with which one wishes to program the processor. The parts of the surface of the processor that are illuminated will then be charged, which will change the surface potential $\psi$ there.

Another possibility is to use the presence of movable charges in the insulator layer. By applying a voltage across the MIS-structure, raising its temperature to about 200° C. and at the same time illuminate it with the desired operator image the movable charges, that are present in the insulator will be displaced more in brightly illuminated areas than in faintly illuminated areas. This gives rise to a varying surface potential $\psi$ (x, y), which is a copy of the operator image.

A further possibility is to use semiconductor lithographic methods in combination with ion implantation. The operator image is then established in the lithographic process and an ion implanted pattern is achieved which gives a varying charge in the insulator-semiconductor interface.

A further possibility is to repopulate surface states and other states inside the oxide with different types of radiation: optical, X-ray and particle radiation.

What is claimed is:

1. A method for comparison between a first optical signal and at least one other signal comprising:
    providing a MIS-structure consisting essentially of at least one metal layer and at least one insulator layer and at least one semiconductor layer;
    comparing said first optical signal with said at least one other signal by simultaneously:
    illuminating the MIS-structure with the first optical signal, thus creating an optically induced change in the surface potential of the MIS-structure; and
    controlling said surface potential of the MIS-structure electrically or optically with said at least one other signal;
    whereby at least one of said first optical signal and said at least one other signal varies as a function of time.

2. A method as in claim 1 including chopping said first optical signal.

3. A method as in claim 1 including optically illuminating the MIS-structure with said at least one other signal that is another optical signal.

4. A method as in claim 3 wherein said first optical signal is two-dimensional and said at least one other signal is also two-dimensional whereby said first optical signal and said at least one other signal are varied over their two-dimensional extent such that they constitute images.

5. A method as in claim 4 wherein an interface between the insulator layer and the semiconductor layer is provided with laterally limited energy wells.

6. A method as in claim 4 wherein charge carriers are present in said semiconductor layer, and including limiting the mobility of charge carriers in the semiconductor layer near an interface with the insulator layer.

7. A method as in claim 3 including scanning in a raster pattern said first optical signal, said first optical signal being point shaped, over the other optical signal which is two-dimensional.

8. A method as in claim 1 including applying a voltage across the MIS-structure with said at least one other signal.

9. A method as in claim 8 including addressing the conducting metal layer, the conducting metal layer being disposed in a pattern of squares over the insulator layer, by x- and y-conductors via a MOS-transistor integrated in the semiconductor layer.

10. A method as in claim 8 including forming a plurality of image points, each image point being the crossing point between a pair of interconnected electric conductors that constitute said metal layer and being insulated from the other conductor pairs defining other image points, and addressing one of said plurality of image points by applying a potential to the relevant conductor pairs.

11. A method as in claim 9 including insulating several conducting layers disposed on the insulator layer and forming an image point with said several conducting layers; optically band-pass filtering said first optical signal and electrically band-pass filtering an electric signal output from said several conducting layers in said MIS-structure such that the first optical signal in each pass-band is color separated thereby.

12. A method as in claim 1 including providing the MIS-structure with a charge as said at least one other signal created by an inherent charge in one from the group of the insulator layer, and the interface between said metal and insulator layers and the interface between the semiconductor and insulator layers.

13. A method as in claim 12 including providing the MIS-structure with a FAMOS-structure provided with said charge by applying a voltage across the FAMOS-structure at the same time it is illuminated with a two-dimensional optical signal constituted by said first optical signal.

14. A method as in claim 12 including providing the MIS-structure with said charge by applying a voltage across the MIS-structure at the same time it is illuminated with a two-dimensional optical signal, constituted by said first optical signal, and raising the MIS-structure's temperature to approximately 200° C.

15. A method as in claim 12 including obtaining the charge by means of ion implantation.

16. A method as in claim 12 including obtaining the charge by a repopulation of interface states and energy states within the oxide by exposing the MIS-structure to radiation.

* * * * *